(12) United States Patent
Funabiki et al.

(10) Patent No.: US 11,745,272 B2
(45) Date of Patent: Sep. 5, 2023

(54) ELECTRICAL DEVICE SYSTEM, ELECTRICAL DEVICE, AND POWER SUPPLY DEVICE

(71) Applicant: Koki Holdings Co., Ltd., Tokyo (JP)

(72) Inventors: Yusuke Funabiki, Ibaraki (JP); Tomomasa Nishikawa, Ibaraki (JP); Takuya Teranishi, Ibaraki (JP); Masayuki Ogura, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 344 days.

(21) Appl. No.: 16/637,278

(22) PCT Filed: Jul. 27, 2018

(86) PCT No.: PCT/JP2018/028258
§ 371 (c)(1),
(2) Date: Feb. 7, 2020

(87) PCT Pub. No.: WO2019/031272
PCT Pub. Date: Feb. 14, 2019

(65) Prior Publication Data
US 2020/0180044 A1    Jun. 11, 2020

(30) Foreign Application Priority Data
Aug. 9, 2017    (JP) ................................. 2017-154327

(51) Int. Cl.
*H01M 50/256*    (2021.01)
*B23B 45/02*    (2006.01)
(Continued)

(52) U.S. Cl.
CPC ........... *B23B 45/02* (2013.01); *H01M 50/204* (2021.01); *H01M 50/256* (2021.01); *H01M 50/262* (2021.01); *H01M 2220/30* (2013.01)

(58) Field of Classification Search
USPC ........................................................ 173/217
See application file for complete search history.

(56) References Cited

U.S. PATENT DOCUMENTS

2008/0311795 A1* 12/2008 Brotto .................. H02J 7/0026
439/628
2014/0147718 A1    5/2014 Furui et al.
(Continued)

FOREIGN PATENT DOCUMENTS

CN    203967149    11/2014
DE    112014002588    3/2016
(Continued)

OTHER PUBLICATIONS

"Office Action of German Counterpart Application", dated Oct. 20, 2020, with English translation thereof, pp. 1-13.
(Continued)

*Primary Examiner* — Chinyere J Rushing-Tucker
(74) *Attorney, Agent, or Firm* — JCIPRNET

(57) ABSTRACT

The electrical device comprises a common device main body having selectively and detachably attached thereto either a variable-voltage power supply device or a high-voltage power supply device. The device main body has: a protruding section that abuts a power supply-side main erroneous attachment prevention section provided in the variable-voltage power supply device and the high-voltage power supply device; a device-side main erroneous attachment prevention section that abuts the power supply-side main erroneous attachment prevention section provided in a low-voltage power supply device and prevents the low-voltage power supply device from abutting an attachment positioning section; and a device-side attachment permitting section that can be combined in a power supply-side auxil-
(Continued)

iary erroneous attachment prevention section provided in the high-voltage power supply device.

8 Claims, 19 Drawing Sheets

(51) Int. Cl.
*H01M 50/262* (2021.01)
*H01M 50/204* (2021.01)

(56) References Cited

U.S. PATENT DOCUMENTS

| | | | |
|---|---|---|---|
| 2016/0020443 A1 | 1/2016 | White et al. | |
| 2016/0204475 A1* | 7/2016 | White | H01M 50/209 429/97 |

FOREIGN PATENT DOCUMENTS

| | | |
|---|---|---|
| JP | 2002027675 | 1/2002 |
| JP | 2006326765 | 12/2006 |
| JP | 2014128856 | 7/2014 |
| JP | 2016087724 | 5/2016 |
| WO | 2012005159 | 1/2012 |
| WO | 2012039418 | 3/2012 |
| WO | 2014148452 | 9/2014 |

OTHER PUBLICATIONS

"Office Action of Germany Counterpart Application" with English translation thereof, dated Sep. 29, 2021, p. 1-p. 13.
"International Search Report (Form PCT/ISA/210) of PCT/JP2018/028258", dated Aug. 21, 2018, with English translation thereof, pp. 1-3.
"Office Action of German Counterpart Application", dated Apr. 7, 2020, with English translation thereof, pp. 1-14.
"Office Action of China Counterpart Application", dated Jan. 11, 2023, with English translation thereof, pp. 1-16.

* cited by examiner

|  | DEVICE MAIN BODY (10a) 14.4 V | DEVICE MAIN BODY (10b) 18 V | DEVICE MAIN BODY (10c、10g) 36 V |
|---|---|---|---|
| ADDITIONAL LOW VOLTAGE POWER SUPPLY DEVICE (20a) 14.4 V | ◯ | ◯ | × |
| LOW VOLTAGE POWER SUPPLY DEVICE (20b) 18 V | × | ◯ | × |
| VARIABLE-VOLTAGE POWER SUPPLY DEVICE (20c、20e) 36 V-18 V | × | ◯ | ◯ |
| HIGH VOLTAGE POWER SUPPLY DEVICE (20d、20f、20g) 36 V | × | × | ◯ |

ELECTRICAL DEVICE SYSTEM, ELECTRICAL DEVICE, AND POWER SUPPLY DEVICE

CROSS-REFERENCE TO RELATED APPLICATION

This application is a 371 application of the International PCT application serial no. PCT/JP2018/028258, filed on Jul. 27, 2018, which claims the priority benefits of Japan Patent Application No. 2017-154327, filed on Aug. 9, 2017. The entirety of each of the above-mentioned patent applications is hereby incorporated by reference herein and made a part of this specification.

BACKGROUND

Technical Field

The present disclosure relates to an electrical device such as an electrically operated machine or the like, a power supply device attached to the electrical device, and an electrical device system constituted by the electrical device and the power supply device.

Description of Related Art

In an electrical device actuated by electric power, a power supply device such as a battery pack or the like is detachably attached to a power supply attaching section of a device main body. For example, as disclosed in Patent Document 1, each of electrically driven machines such as a drill, an impact wrench, an impact driver, a lawn mower, a dust collector, a circular sawing machine, and the like, which are electrical devices, has a battery pack detachably attached to a device main body.

Even in the electrically driven machines of the same type, there are plurality of types in which output torques of electric motors are different according to working conditions. For example, in an impact driver configured to perform fastening work while applying an impact torque to a driven member such as a bolt or the like, a rated voltage of an electric motor may be classified as 14.4 V type or 18 V type. Irrespective of the type of impact driver, a basic structure of an attachment/detachment mechanism of a power supply attaching section on the side of the device main body and the attachment/detachment section of the battery pack that is the power supply device are standardized. The power supply attaching section has guide rails provided on both sides, and the attachment/detachment section of the battery pack has guide rails inserted into guide grooves of the guide rail. When the attachment/detachment mechanism is standardized, the battery packs that are the same power supply device can also be attached to different types of electrically driven machines, and for example, the same battery pack can also be attached to an impact wrench as well as being able to be attached to an impact driver.

In this way, when the attachment/detachment structure of a power supply attaching section of an electrical device such as an electrically driven machine or the like and the attachment/detachment section of a battery pack are standardized, and a plurality of types having different working voltages can be connected in series on the same type of electrically operated machine or the same battery pack can be attached to different types of electrically operated machine, a configuration of preventing erroneous attachment is provided to prevent a battery pack having a voltage different from a rated voltage of a device main body from being attached to the device main body (Patent Document 2).

RELATED ART

Patent Document

[Patent Document 1] Japanese Patent Laid-Open Publication No. 2016-87724
[Patent Document 2] PCT International Publication No. WO 2014/148452

SUMMARY

Problems to be Solved

In electrical devices such as electrically operated machines or the like, even if they are of the same type, being able to increase the number of types of power supply device which are able to be attached to a device main body and being able to connect many electrical devices having different rated voltages according to applications thereof or the like are desired. When the types of the power supply devices attached to the electrical devices of the same type or different types are increased, structures of a power supply attaching section and an attachment/detachment section cannot be standardized.

An aspect of the present disclosure is directed to providing an electrical device system, electrical device and power supply device, which are configured to prevent erroneous attachment of inappropriate power supply devices among a lot of power supply devices having different output voltages to a device main body while standardizing an attachment/detachment mechanism of the device main body and the power supply device even when types of power supply devices are increased.

In addition, an aspect of the present disclosure is directed to providing an electric system, an electrical device and a power supply device, which are configured to prevent erroneous attachment of inappropriate device main bodies when a high voltage power supply device is developed.

Means for Solving the Problems

An electrical device system of the present disclosure includes a first power supply device that is able to selectively output a first voltage and a second voltage larger than the first voltage; a second power supply device that is able to output the second voltage; a first device main body to which the first power supply device is connectable and the second power supply device is not connectable, and driven at the first voltage; and a second device main body to which the first power supply device and the second power supply device are connectable, and driven at the second voltage.

An electrical device system of the present disclosure is an electrical device system including: a low voltage power supply device that is able to output a low voltage, a variable-voltage power supply device that is able to selectively output a high voltage or a low voltage, a low voltage device main body to which the low voltage power supply device or the variable-voltage power supply device is selectively attachable, and a common device main body to which the variable-voltage power supply device is attachable, wherein the low voltage power supply device has a power supply-side main erroneous attachment prevention section configured to abut a device-side main erroneous attachment prevention section provided on the common device main body.

An electrical device of the present disclosure is an electrical device including a first device main body to which a first power supply device configured to output a first voltage is detachably attached, the electrical device including: a device-side erroneous attachment prevention section configured to prevent attachment of a second power supply device and a third power supply device, the second power supply device configured to output a second voltage lower than the first voltage, the third power supply device that outputs a third voltage lower than the second voltage.

An electrical device of the present disclosure is an electrical device including: a device main body to which any one of a variable-voltage power supply device and a high voltage power supply device is selectively detachably attached, the variable-voltage power supply device is able to selectively output a high voltage or a low voltage, the high voltage power supply device is able to output a high voltage, wherein the device main body includes: a device-side main erroneous attachment prevention section configured to avoid abutting a power supply-side main erroneous attachment prevention section provided on the variable-voltage power supply device and the high voltage power supply device, and abut a power supply-side main erroneous attachment prevention section provided on a low voltage power supply device that is able to output a low voltage; and a device-side attachment permitting section combined with a power supply-side auxiliary erroneous attachment prevention section provided on the high voltage power supply device.

A power supply device of the present disclosure is a power supply device including a high voltage power supply device that is able to output a high voltage, wherein the high voltage power supply device has a power supply-side auxiliary erroneous attachment prevention section configured to prevent attachment to a device main body to which a low voltage power supply device that is able to output a first low voltage lower than the high voltage is able to be attached.

Even when types of power supply devices are increased, it is possible to prevent erroneous attachment of an inappropriate power supply device to a device main body while standardizing an attachment/detachment section of the device main body and the power supply device.

BRIEF DESCRIPTION OF THE DRAWINGS

FIG. 11A shows a state in which the battery pack is attached to the device main body shown in FIG. 2B, and FIG. 11B shows a state in which the battery pack is attached to the device main body shown in FIG. 3.

FIG. 19 is a system configuration table of an electrical device group constituted by a plurality of device main bodies, and a plurality of battery packs and power supply adapters attached to the device main bodies.

DESCRIPTION OF EMBODIMENTS

Figure 1:
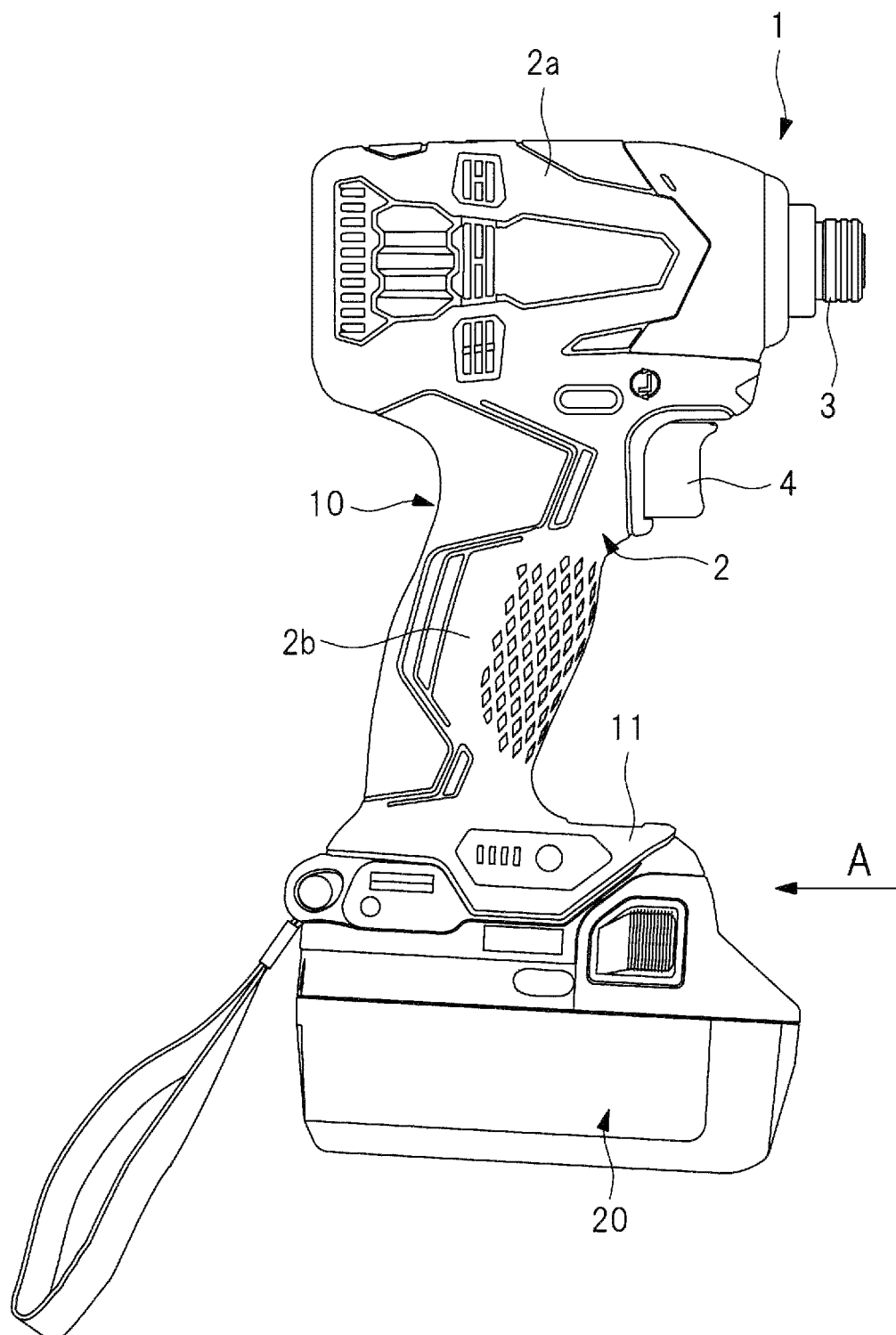
FIG. 1 is a side view showing an impact driver as an example of an electrical device.

Hereinafter, an embodiment of the present disclosure will be described in detail with reference to the accompanying drawings. FIG. 1 is a side view of an impact driver 1 as an example of an electrical device, and the impact driver 1 has a tool main body, i.e., a device main body 10, and is used to perform screw fastening work with a drill bit as a work tool. The device main body 10 has a casing 2 formed of a resin, and the casing 2 includes a driving unit case 2a in which a work tool driving mechanism is incorporated, and a handle section 2b integrated with the driving unit case 2a and gripped by a worker. An anvil 3 protrudes from a tip portion of the driving unit case 2a, and a bit is detachably attached to the anvil 3 as a work tool. An electric motor is incorporated in the driving unit case 2a, and rotational movement of an output shaft of the electric motor is converted into rotational movement and axial movement of a hammer that is an impact mechanism that constitutes a work tool driving mechanism, and transmitted to the anvil 3. A fastening work of a driven member such as a drill bit or the like is performed by rotating the driven member while continuously applying an impact torque to the driven member. The casing 2 is assembled by making two case pieces on left and right sides face each other, and the two case pieces are connected by case piece connecting sections (not shown).

A power supply attaching section 11 is provided on a lower end portion of the device main body 10, and a power storage pack, i.e., a battery pack 20 as a power supply device is detachably attached to the power supply attaching section 11. The impact driver 1 can be driven by electric power from the battery pack 20, and when a trigger 4 is operated, the electric motor is driven and the anvil 3 is driven.

When a right side of the power supply attaching section 11 in FIG. 1 is a tip portion, as shown by an arrow A in FIG. 1, the battery pack 20 is attached to the power supply attaching section 11 by being moved from a tip portion side thereof toward a rear end portion. A right end portion of the power supply attaching section 11 that is a portion of the battery pack 20 at which attachment is started is a tip portion and a left end portion is a rear end portion in a moving direction upon attachment of the battery pack 20. Also in the battery pack 20, a right end portion in FIG. 1 is a tip portion, and a left end portion is a rear end portion.

In the impact driver 1 shown in FIG. 1, a lot of types having different rated voltages are serialized, and an attachment/detachment structure of the power supply attaching section 11 of a lot of the device main bodies 10 and an attachment/detachment section of a lot of the battery packs 20 as a power supply device are standardized. The impact driver 1 that is an electrical device is constituted by the device main body 10 and the battery pack 20, and the impact driver 1 is brought into an operable state using electric power from the battery pack 20. An electrical device system, i.e., a serialized electrical device group is constituted by a plurality of device main bodies 10 and a plurality of battery packs 20 attached to the device main bodies 10.

Figure 2A:
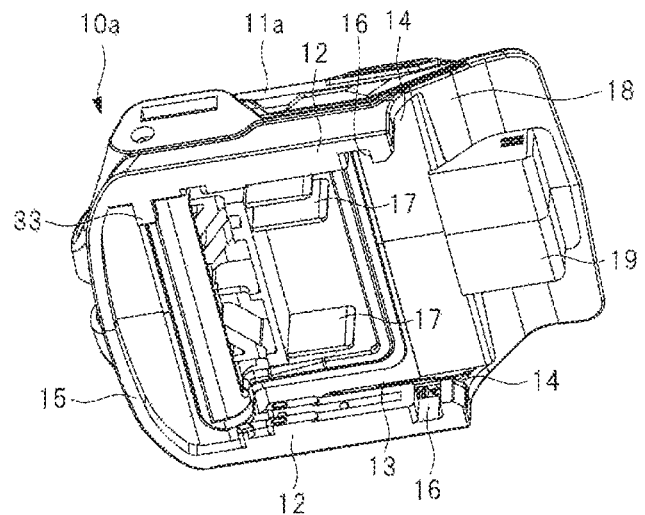
FIG. 2A is a perspective view showing a lower surface of a power supply attaching section of an additional low voltage device main body having a rated voltage of 14.4 V.
Figure 2B:
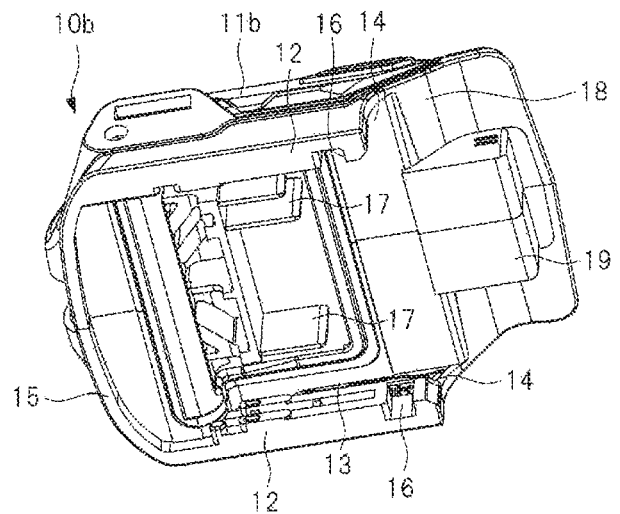
FIG. 2B is a perspective view showing a lower surface of a power supply attaching section of a low voltage device main body having a rated voltage of 18 V.
Figure 3:
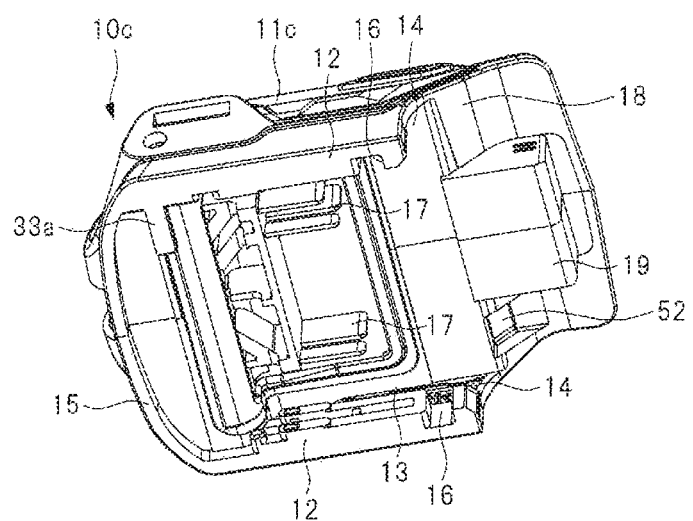
FIG. 3 is a perspective view showing a lower surface of a power supply attaching section of a common device main body having a rated voltage of 36 V.

FIG. 2A is a perspective view showing the power supply attaching section 11*a* of the device main body 10*a* having a rated voltage of 14.4 V, and FIG. 2B is a perspective view showing the power supply attaching section 11*b* of the device main body 10*b* having a rated voltage of 18 V. FIG. 3 is a perspective view showing the power supply attaching section 11*c* of the device main body 10*c* having a rated voltage of 36 V.

In FIG. 2A, FIG. 2B and FIG. 3, three types of device main bodies having different rated voltages or the like are designated by reference numerals 10*a* to 10*c*, and each corresponds to the device main body 10 shown in FIG. 1. In the specification, as shown in FIG. 2B, the device main body 10*b* having a rated voltage of 18 V is a low voltage device main body, and the device main body 10*a* having a rated voltage of 14.4 V that is lower than this rated voltage is an additional low voltage device main body. Further, the device main body 10*c* is a device main body having a rated voltage of 36 V that is higher than that of the device main body 10*b*. The device main body 10*c* is a common device main body to which any one of a variable-voltage power supply device that is able to switch to and output a low voltage (18 V) and a high voltage of 36 V, and a high voltage power supply device that is able to output a high voltage of 36 V is selectively attached.

Guide rails 12 are provided on both side portions of the power supply attaching sections 11*a* to 11*c* of the device main bodies 10*a* to 10*c*. The guide rails 12 protrude downward from contact surfaces 13, and guide grooves 14 are provided inside the guide rails 12. A protruding section 15 extending and protruding downward in a widthwise direction of the power supply attaching sections 11*a* to 11*c* is provided between rear end portions of the left and right guide rails 12. The protruding section 15 is continuous with the left and right guide rails 12, and a bottom surface of the protruding section 15 is flush with bottom surfaces of the guide rails 12. In addition, a rib 33 (to be described below) is formed between the protruding section 15 and the guide rails 12 in a forward/rearward direction.

Figure 4:
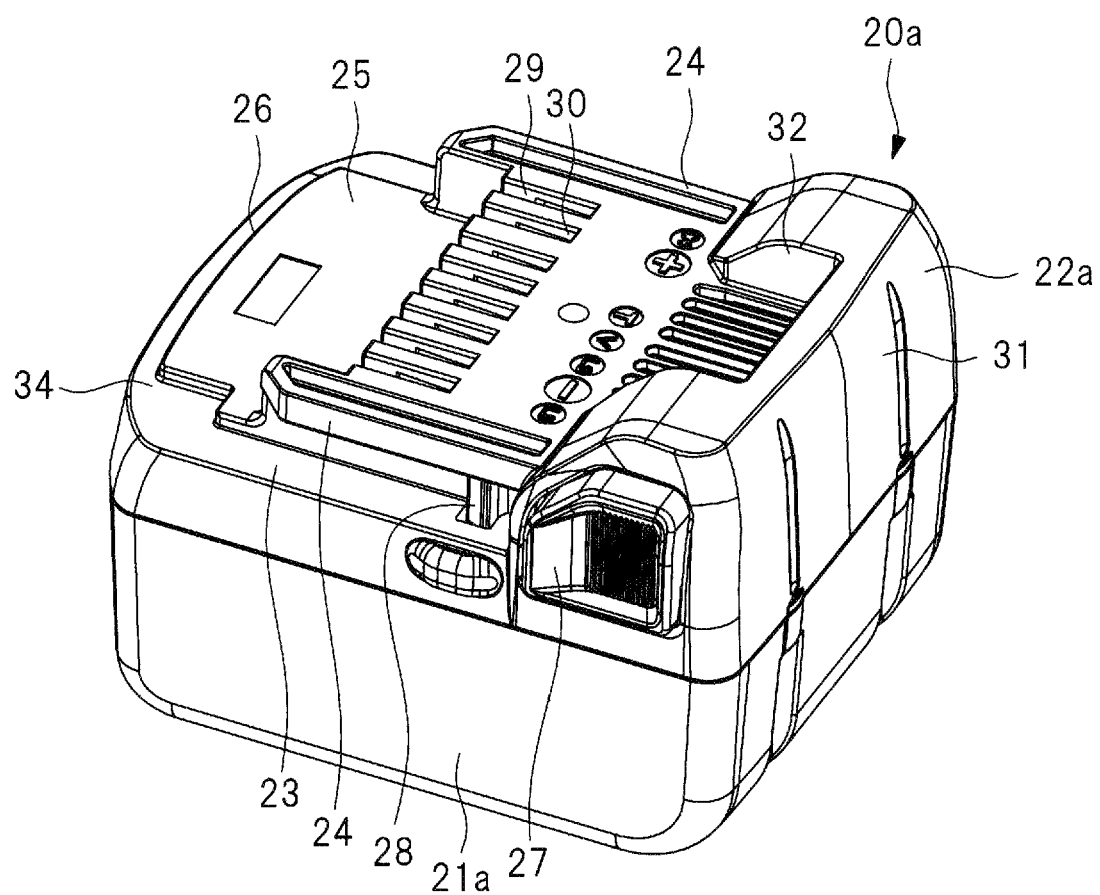
FIG. 4 is a perspective view showing a battery pack as an additional low voltage power supply device that outputs 14.4 V.

FIG. 4 is a perspective view showing the battery pack 20*a* having a rated voltage (nominal voltage) of 14.4 V. The battery pack 20*a* is attached to an additional low voltage device main body 10*a* shown in FIG. 2A, and can also be attached to a low voltage device main body 10*b* shown in FIG. 2B. The battery pack 20*a* constitutes the additional low voltage power supply device.

Figure 5:
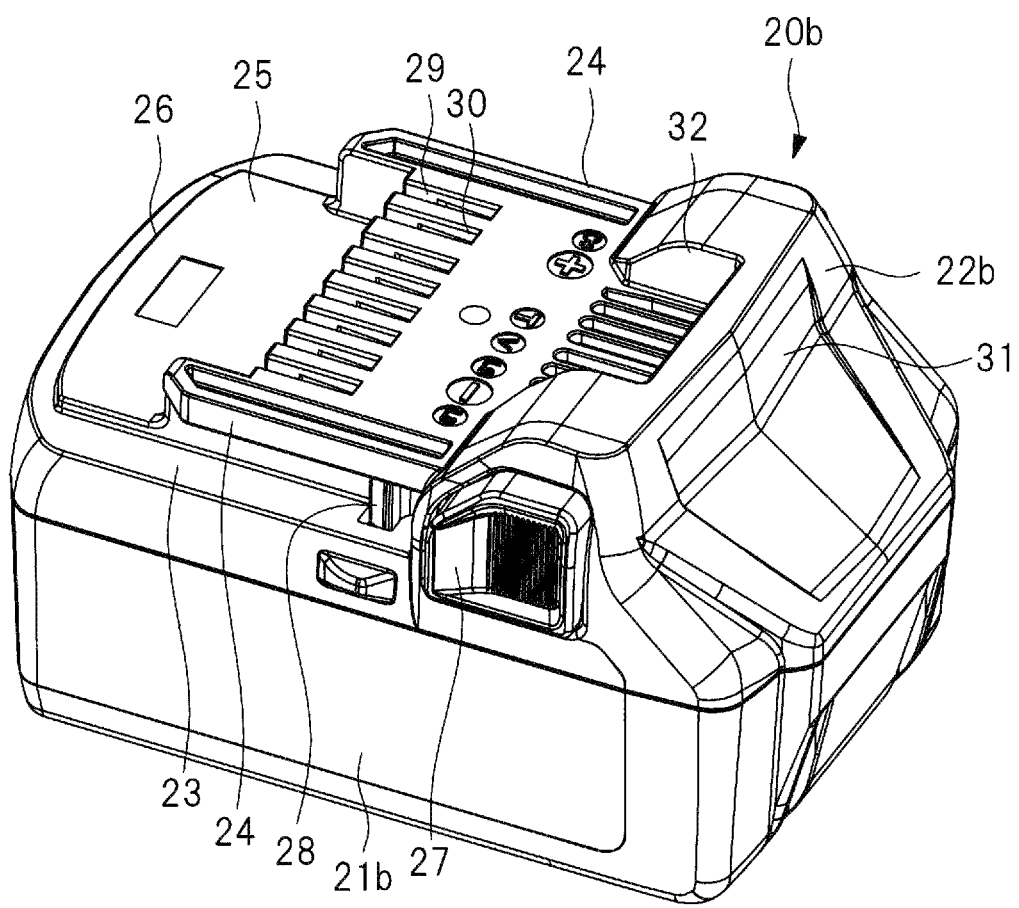
FIG. 5 is a perspective view showing a battery pack as a low voltage power supply device that outputs 18 V.

FIG. 5 is a perspective view showing the battery pack 20*b* having a rated voltage (nominal voltage) of 18 V. The battery pack 20*b* is attached to the low voltage device main body 10*b* shown in FIG. 2B and constitutes the low voltage power supply device.

Figure 6:
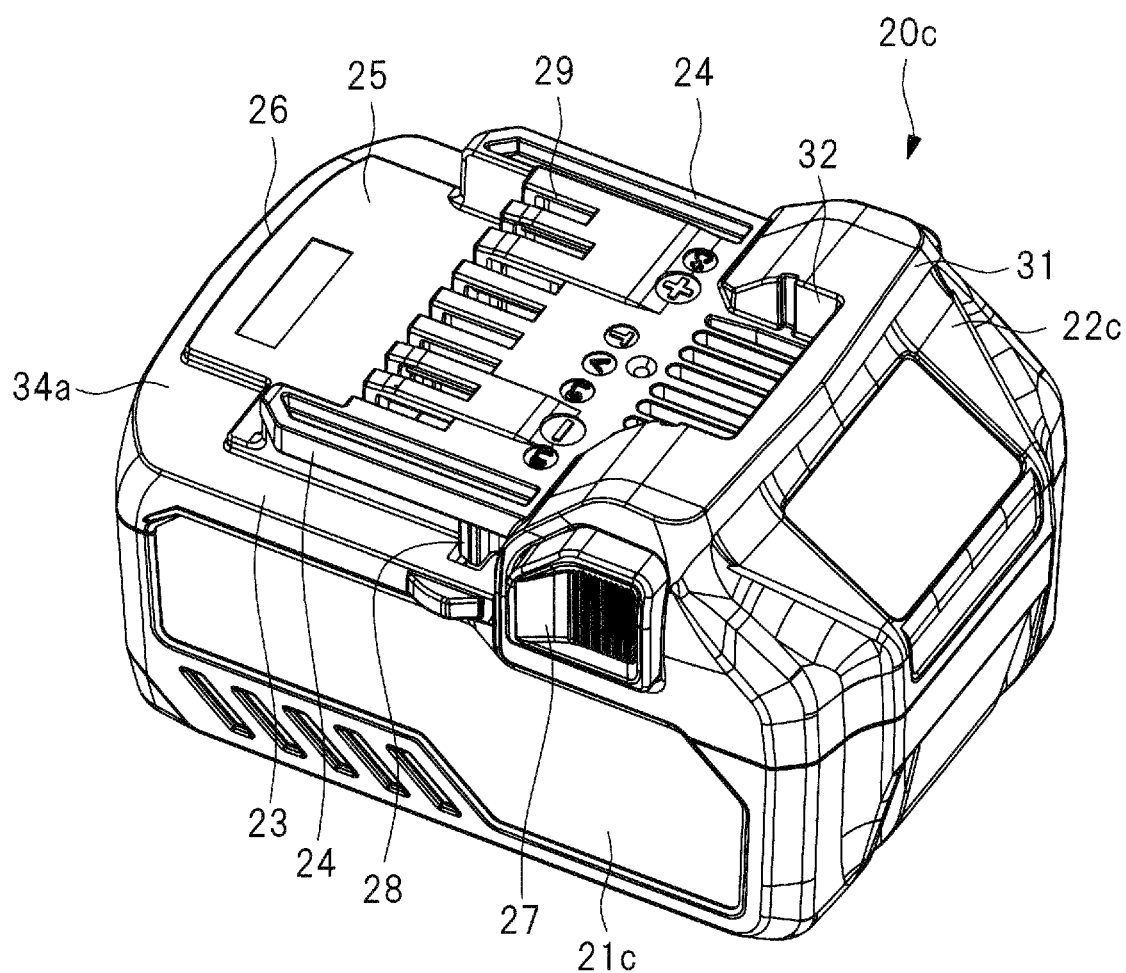
FIG. 6 is a perspective view showing a battery pack as a variable-voltage power supply device that is able to selectively output 18 V or 36 V.

FIG. 6 is a perspective view showing the battery pack 20*c* that is able to selectively output a rated voltage (nominal voltage) of 18 V or 36 V. The battery pack 20*c* can also be attached to any one of the low voltage device main body 10*b* shown in FIG. 2B and the common device main body 10*c* shown in FIG. 3, and constitutes a variable-voltage power supply device that is able to selectively output a low voltage or a high voltage.

Figure 7:
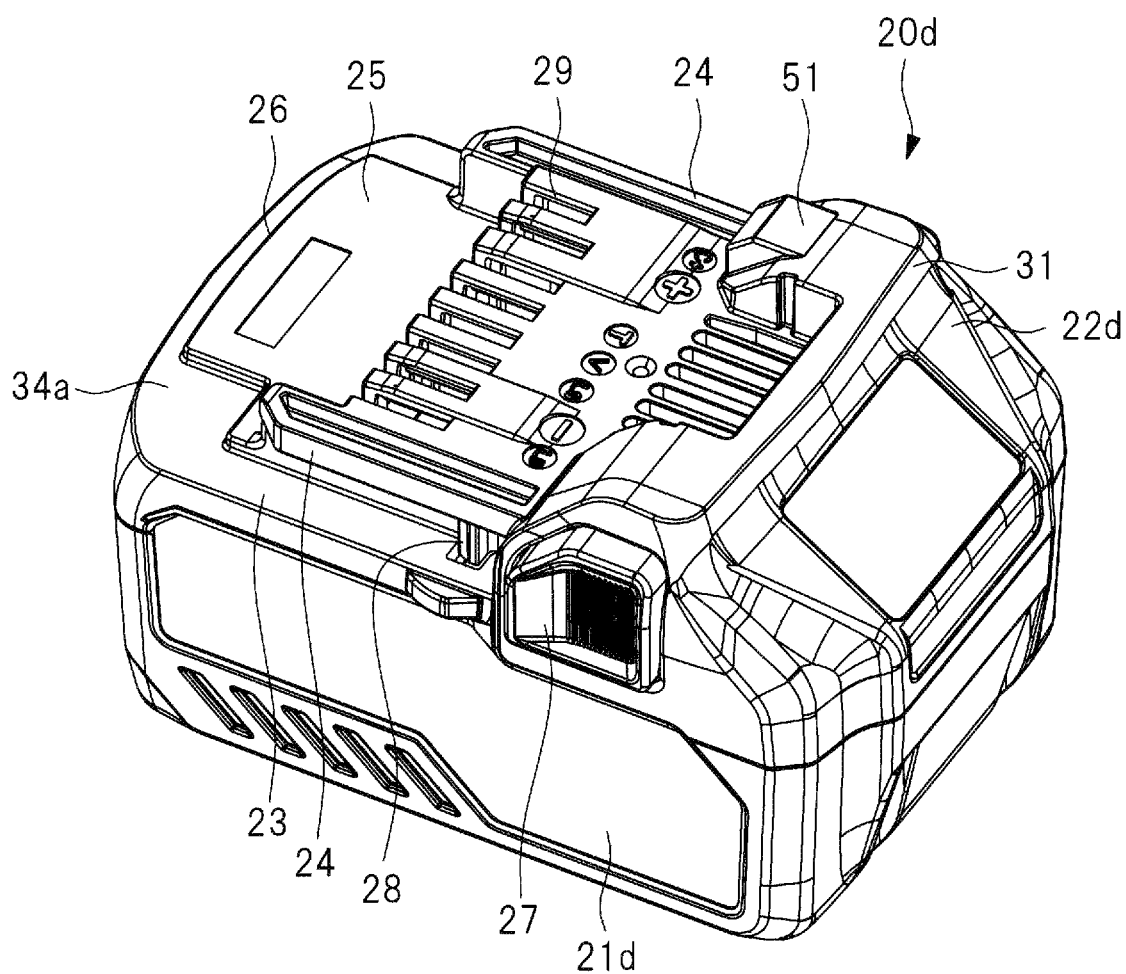
FIG. 7 is a perspective view showing a battery pack as a high voltage power supply device that outputs 36 V.

FIG. 7 is a perspective view showing the battery pack 20*d* having a rated voltage (nominal voltage) of 36 V. The battery pack 20*d* is attached to the common device main body 10*c* shown in FIG. 3, and constitutes the high voltage power supply device.

The battery packs 20*a* to 20*d* have battery pack main bodies 21*a* to 21*d* formed of a resin and in which a lot of battery cells are accommodated, and attachment/detachment sections 22*a* to 22*d* formed of a resin and assembled to the battery pack main bodies 21*a* to 21*d*. Contact surfaces 23 in contact with the contact surfaces 13 of the power supply attaching sections 11*a* to 11*c* of the device main bodies 10*a* to 10*c* are provided on upper surfaces of the attachment/detachment sections 22*a* to 22*d*. Slide rails 24 are provided on both sides of the battery packs 20*a* to 20*d*, and the slide rails 24 are guided to the guide rails 12 and enter the guide grooves 14 when the battery packs 20*a* to 20*d* are attached to the power supply attaching sections 11*a* to 11*d*. In the attachment/detachment sections 22*a* to 22*d* of the battery packs, a power supply-side erroneous attachment prevention section (a main erroneous attachment prevention section) 25 is provided to protrude upward from the contact surfaces 23, and when the battery pack is attached to the device main body, the erroneous attachment prevention section 25 enters between rear end portions of the left and right guide rails 12 of the device main body. A rear end surface, i.e., a stepped surface of the erroneous attachment prevention section 25 forms a stopper section 26, and when the battery packs 20*a* to 20*d* are attached to the power supply attaching sections 11*a* to 11*c*, the stopper section 26 is disposed on a tip side of the protruding sections 15 of the power supply attaching sections 11*a* to 11*c*, an attachment/detachment operating section 31 of the battery pack 20 (to be described below) abuts an abutting surface 18, and an attachment position of the battery pack with respect to the device main body is set. A dimension between a surface of the erroneous attachment prevention section 25 and the slide rails 24 is slightly larger than a thickness dimension of the guide rails 12 in the upward/downward direction.

Left and right push buttons 27 are provided on tip portions of the battery packs, and the push buttons 27 protrude outward from left and right side surfaces of the battery pack. Spring members (not shown) configured to apply spring forces in directions in which the push buttons 27 protrude are provided in the battery pack. Claws 28 are provided on the push buttons 27, respectively. The push buttons 27 and the claw 28 are formed as a latch section. Meanwhile, as shown in FIG. 2A, FIG. 2B and FIG. 3, engaging grooves 16 are provided in tip side portions of the guide rails 12 of the power supply attaching section, and when the battery pack is attached to an attachment terminating position of the power supply attaching section, the claws 28 are engaged with the engaging grooves 16, and the battery pack is locked (fixed) to the power supply attaching section. Here, the attachment/detachment operating section 31 of the battery pack 20 abuts an abutting section 18.

As shown in FIG. 2A, FIG. 2B and FIG. 3, a plurality of device-side terminals 17 are provided on the device main bodies 10a to 10c, respectively, and the device-side terminals 17 protrude downward from the contact surfaces 13. A plurality of slits 29 are provided in the battery packs 20a to 20d to correspond to the device-side terminals 17, and a power supply-side terminal 30 protruding toward the slits 29 and in contact with the device-side terminals 17 is provided on the battery pack. When the battery packs 20a to 20d are attached to the device main bodies 10a to 10c, the device-side terminals 17 come into contact with the power supply-side terminal 30. The device-side terminals 17 and the power supply-side terminal 30 are power supply terminals configured to supply electric power from the battery pack to an electric motor or the like of the device main body, and information communication terminals configured to transmit information such as a voltage or the like of the battery pack to the device main body or transmit information on the device main body side to the power supply device.

The attachment/detachment operating section 31 protruding upward from the slide rails 24 is provided on tip portions of the battery packs 20a to 20d, and the push buttons 27 protrude outward from both of left and right end portions of the attachment/detachment operating section 31. The abutting section 18 abutting the attachment/detachment operating section 31 is provided on the power supply attaching sections 11a to 11d of the device main bodies 10a to 10c, and the abutting section 18 covers a part of the attachment/detachment operating section 31. Since the attachment/detachment operating section 31 of the battery packs 20a to 20d abuts an inclined surface of the abutting section 18 on a rear end side, attachment and movement of the battery pack 20 is restricted. The attachment/detachment operating section 31 functions as a stopper. The casing 2 that forms the device main bodies 10a to 10c has two case pieces, and a case piece connecting section 19 protrudes downward from the abutting section 18 and is provided on the power supply attaching sections 11a to 11e. The case piece connecting section 19 is a protrusion having a function of a cover and protruding downward from the abutting section 18. A concave accommodating section 32 into which the case piece connecting section 19 is inserted is formed in a central section of the attachment/detachment operating section 31 of the battery pack in the widthwise direction, and the concave accommodating section 32 opens toward a rear end portion of the battery pack.

An attachment/detachment structure of the power supply attaching section constituted by the guide rails 12 or the like, and an attachment/detachment structure of the battery pack constituted by the slide rails 24 or the like are standardized in the device main bodies 10a to 10c and the battery packs 20a to 20d.

As shown in FIG. 2A, the protruding section 15 protruding downward is provided on a rear end portion of the power supply attaching section 11a of the additional low voltage device main body 10a, and the rib 33 as a device-side erroneous attachment prevention section (a main erroneous attachment prevention section) protruding inward in the widthwise direction of the device main body 10a from one of the guide rails 12 is provided on a side surface in the widthwise direction between the protruding section 15 and slide rail 12 in the forward/rearward direction. The rib 33 is disposed on the side of the tip of the device main body 10a with respect to the protruding section 15.

Figure 8:
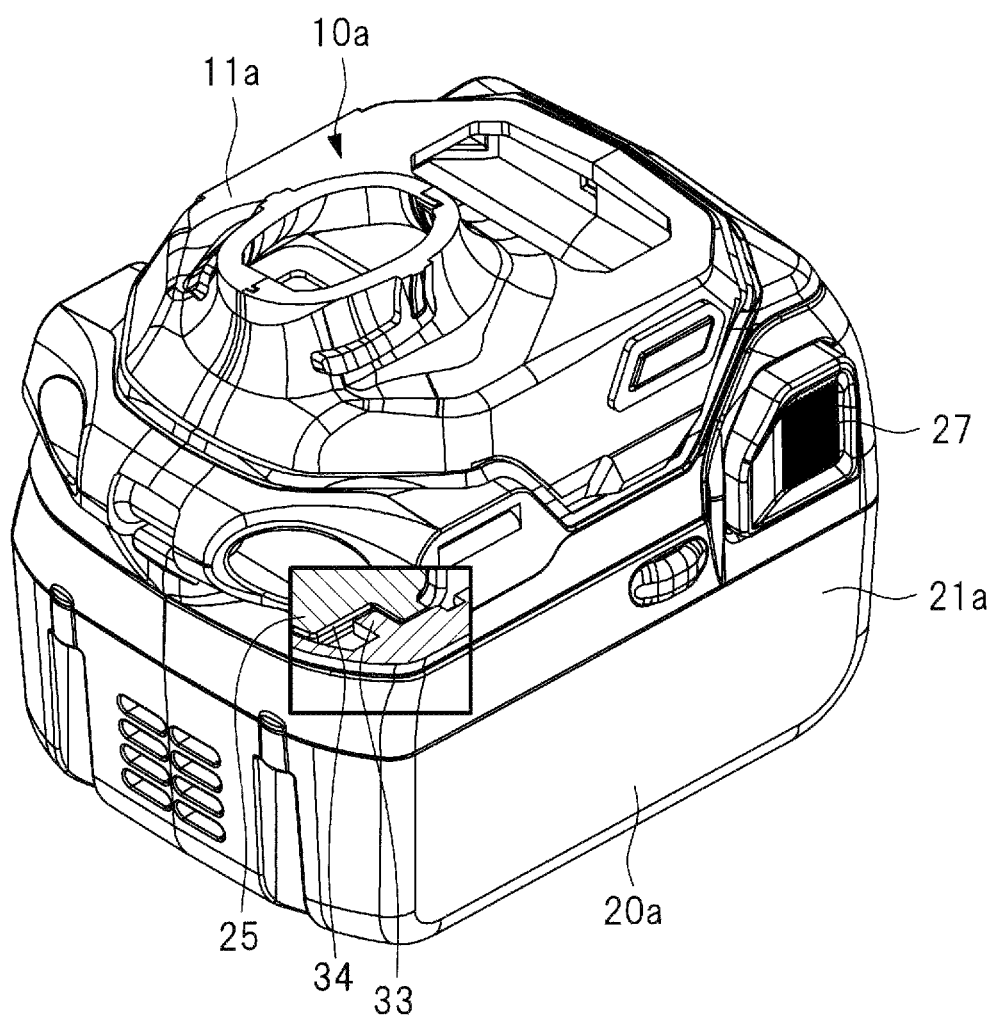
FIG. 8 is a partially cutaway perspective view showing a state in which the battery pack in FIG. 4 is attached to the device main body in FIG. 2A.

Meanwhile, as shown in FIG. 4, a cutout section 34 is provided on one side of the erroneous attachment prevention section 25 of the battery pack 20a in the widthwise direction as an additional low voltage power supply device. When the slide rails 24 of the battery pack 20a are inserted into the guide grooves 14 of the device main body 10a to attach the battery pack 20a to the device main body 10a, as shown in FIG. 8, the rib 33 enters the cutout section 34, and the battery pack 20a is attached to the device main body 10a. Here, the attachment/detachment operating section 31 abuts the abutting section 18. FIG. 8 shows a state in which the battery pack 20a is attached to the power supply attaching section 11a of the device main body 10a. When attachment is terminated, the claws 28 are engaged with the engaging grooves 16. Accordingly, electric power of 14.4 V can be supplied to the impact driver 1 that is an electrical device having a rated voltage of 14.4 V.

Figure 9:
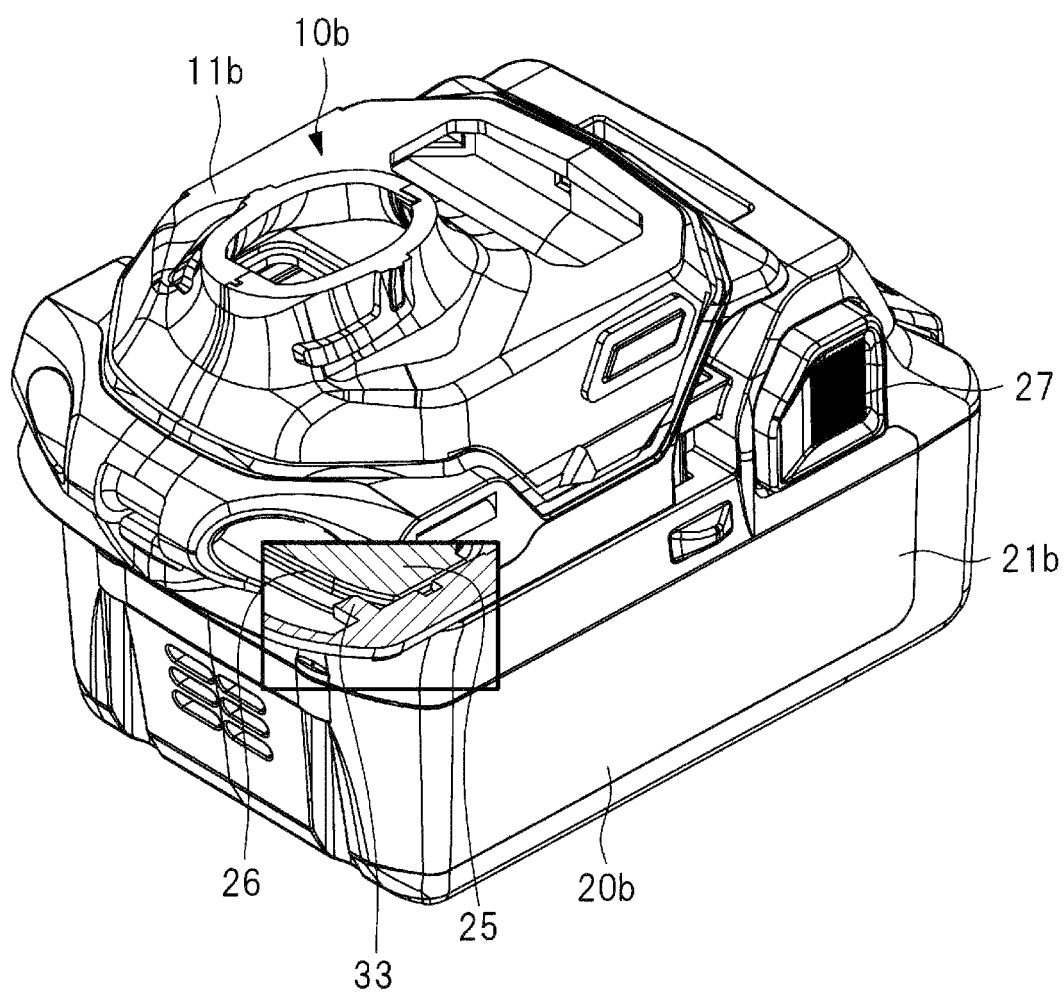
FIG. 9 is a partially cutaway perspective view showing a state in which the battery pack in FIG. 5 is not attached to the device main body in FIG. 2A.

As shown in FIG. 5, the above-mentioned cutout section 34 is not formed in the erroneous attachment prevention section 25 of the battery pack 20b as the low voltage power supply device. Accordingly, as shown in FIG. 9, when the battery pack 20b is attached to the power supply attaching section 11a of the device main body 10a, before the battery pack 20b is disposed at a predetermined attachment terminating position, the stopper section 26 of the power supply-side erroneous attachment prevention section 25 abuts the rib 33 as the device-side erroneous attachment prevention section. Accordingly, a power supply of the battery pack 20b having a voltage of 18 V is prevented from being erroneously attached to the device main body 10a having a rated voltage of 14.4 V. FIG. 9 shows a state in which the stopper section 26 of the erroneous attachment prevention section 25 abuts the rib 33 and the battery pack 20b cannot be attached to the device main body 10a. In this way, erroneous attachment of the battery pack 20b is prevented.

As shown in FIG. 2B, the rib 33 as the erroneous attachment prevention section shown in FIG. 2A is not provided on the power supply attaching section 11b of the low voltage device main body 10b. Accordingly, when the battery pack 20b is attached to the device main body 10b, the battery pack 20b is moved to an attachment terminating position at which the attachment/detachment operating section 31 abuts the abutting section 18, and the battery pack 20b can be attached to the device main body 10b. When attachment is terminated, the claws 28 are engaged with the engaging grooves 16. Accordingly, electric power of 18 V can be supplied to the impact driver 1 that is an electrical device having a rated voltage of 18 V.

In this way, since the rib 33 is not provided on the device main body 10b, the battery pack 20a shown in FIG. 4 can be attached to the device main body 10b. In this case, while electric power of 14.4 V is supplied to the electrical device having a rated voltage of 18 V and a rated voltage of the device main body 10*b* is not supplied, damage to a motor or the like in the electrical device can be prevented.

As shown in FIG. 3, the rib 33*a* as the device-side erroneous attachment prevention section (the main erroneous attachment prevention section) disposed on the side of the tip of the device main body 10*c* with respect to the protruding section 15 is provided on one of the guide rails 12 of the common device main body 10*c*. The rib 33*a* protrudes inward from the guide rails 12 in the widthwise direction of the device main body 10*a*, and a protrusion dimension is larger than that of the rib 33 shown in FIG. 2A.

Meanwhile, as shown in FIG. 6, the cutout section 34*a* into which the rib 33*a* enters is provided in the erroneous attachment prevention section 25 of the battery pack 20*c* as the variable-voltage power supply device. When the slide rails 24 of the battery pack 20*c* are inserted into the guide grooves 14 of the device main body 10*c* to attach the battery pack 20*c* to the device main body 10*c*, the rib 33*a* enters the cutout section 34*a*, and the rib 33*a* avoids the erroneous attachment prevention section 25 and does not abut the erroneous attachment prevention section 25. Then, the attachment/detachment operating section 31 of the battery pack 20 abuts the abutting section 18, and the battery pack 20*c* is attached to the device main body 10*c*. The cutout section 34*a* is formed by cutting out the erroneous attachment prevention section 25, and is larger than the cutout section 34 formed in the battery pack 20*a* in the widthwise direction.

Since the rib 33 as shown in FIG. 2A is not provided on the power supply attaching section 1*ib* of the low voltage device main body 10*b*, the battery pack 20*c* can be attached to the device main body 10*b*. In this way, the battery pack 20*c* can also be attached to any one of the low voltage device main body 10*b* and the high voltage device main body 10*c*.

Figure 10:
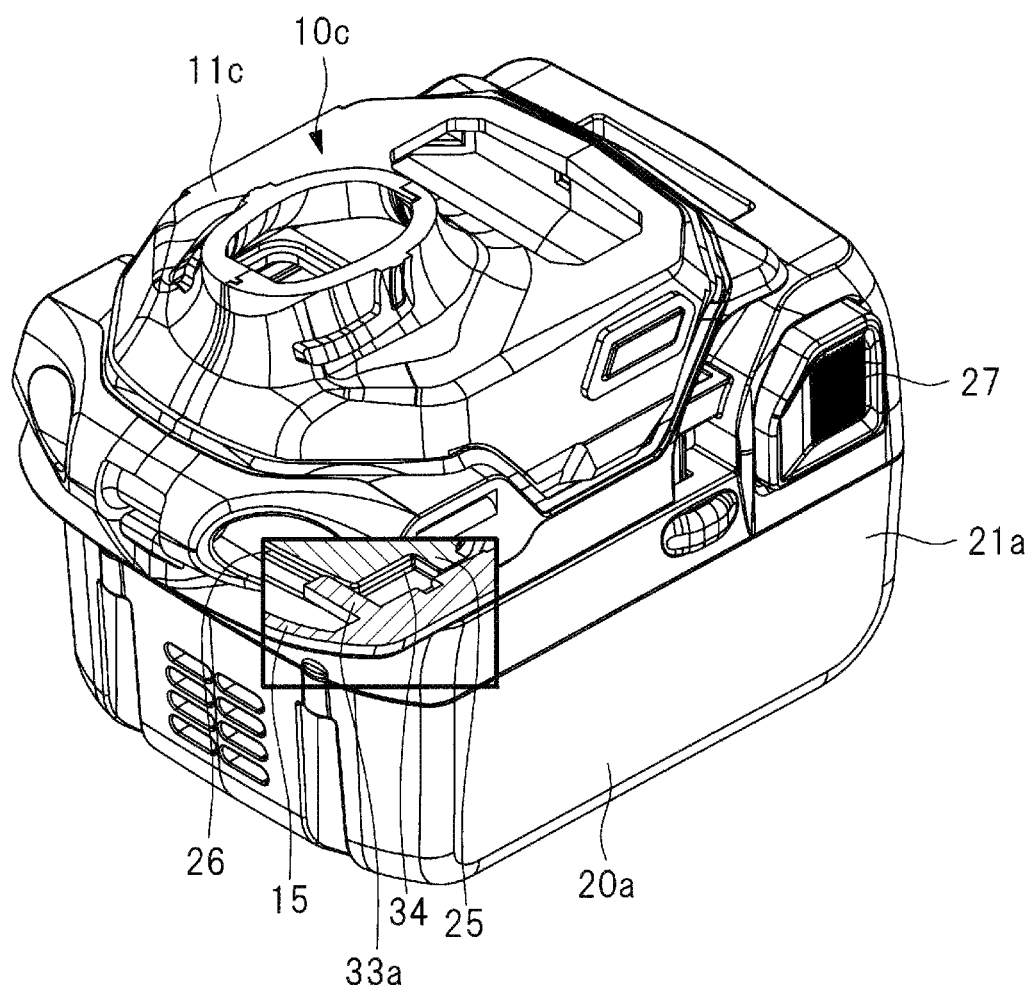
FIG. 10 is a partially cutaway perspective view showing a state in which the battery pack in FIG. 4 is not attached to the device main body in FIG. 3.

Since the rib 33*a* having a protrusion dimension larger than that of the rib 33 is provided on the common device main body 10*c* as the device-side erroneous attachment prevention section, when the battery pack 20*a* is attached to the device main body 10*c*, as shown in FIG. 10, the stopper section 26 of the power supply-side erroneous attachment prevention section 25 abuts the rib 33*a*. Accordingly, the battery pack 20*a* cannot be attached to the device main body 10*c*. FIG. 10 shows a state in which the stopper section 26 abuts the rib 33*a*.

Since the cutout section 34*a* is not formed in the battery pack 20*b*, when the battery pack 20*b* is inserted into the device main body 10*c*, the erroneous attachment prevention section 25 abuts the rib 33*a*. Accordingly, the battery pack 20*b* cannot be attached to the device main body 10*c*, and erroneous attachment of the battery pack 20*b* to the device main body 10*c* is prevented.

While the rib 33*a* as the erroneous attachment prevention section in the device main body 10*c* is provided on one of the guide rails 12, the ribs may be provided on both of the guide rails 12 and may be provided on the protruding section 15 to protrude forward from the device main body 10*c*. Irrespective of the type, the cutout section is formed in the erroneous attachment prevention section 25 of the battery pack 20*c* or 20*d* to correspond to the device main body 10*c*. In addition, movement of the battery pack 20 may be restricted when the stopper section 26 of the erroneous attachment prevention section 25 abuts the protruding section 15.

Figure 11:
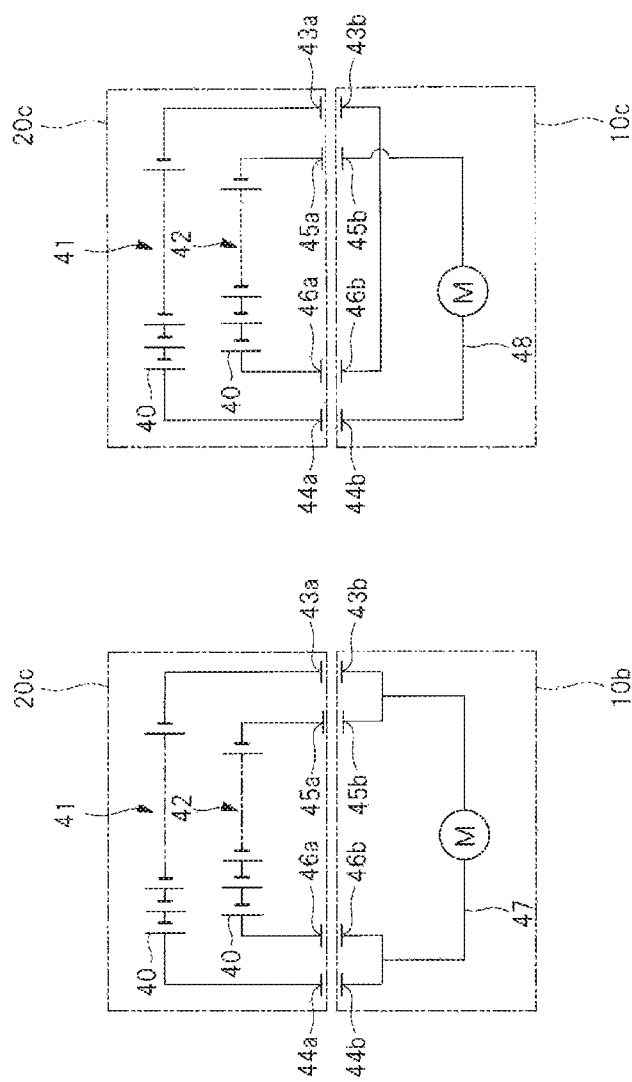
FIG. 11A and FIG. 11B are a connecting circuit diagram of battery cells showing a power storage unit incorporated in the battery pack shown in FIG. 6.

FIG. 11A and FIG. 11B are a connecting circuit diagram of battery cells showing a power storage unit incorporated in the battery pack 20*c* that is the variable-voltage power supply device shown in FIG. 6, FIG. 11A shows a state in which the battery pack 20*c* is attached to the low voltage device main body 10*b* shown in FIG. 2B, and FIG. 11B shows a state in which the battery pack 20*c* is attached to the high voltage device main body 10*c* shown in FIG. 3.

The battery pack 20*c* has a first power storage unit 41 and a second power storage unit 42, each in which a plurality of battery cells 40 are connected to each other in series. The power storage units 41 and 42 are electrically separated from each other and accommodated in a single battery pack main body 21*c*, and output a rated voltage (nominal voltage) of 18 V that is a low voltage. The first power storage unit 41 has power supply-side terminals 44*a* and 43*a* for a positive electrode and a negative electrode, and the second power storage unit 42 has power supply-side terminals 46*a* and 45*a* for a positive electrode and a negative electrode. The power supply terminals protrude toward the slits 29.

Device-side terminals 43*b*, 44*b*, 45*b* and 46*b* connected to the power supply-side terminals are provided on the low voltage device main body 10*b*, and a parallel connecting circuit 47 configured to connect the plurality of power storage units 41 and 42 in parallel is provided on the device main body 10*b*. Electric power having a voltage of 18 V is supplied to an electric motor M or the like of the device main body 10*b*, to which the two power storage units 41 and 42 are connected in parallel, by the parallel connecting circuit 47. Meanwhile, a serial connecting circuit 48 configured to connect the plurality of power storage units 41 and 42 in serial is provided on the common device main body 10*c*. Electric power having a voltage of 36 V is supplied to the electric motor M or the like of the device main body 10*c* by the serial connecting circuit 48. Further, each of the device-side terminals 44*b* and 46*b* for a positive electrode and the device-side terminals 43*b* and 45*b* for a negative electrode of the device main body 10*b* is constituted by a single terminal (see FIG. 2B). The two power storage units are connected in parallel when the two power supply-side terminals 44*a* and 46*a* are connected to the device-side terminal for a single positive electrode and the two power supply-side terminals 43*a* and 45*a* are connected to the device-side terminal for a single negative electrode (FIG. 11A). In this way, the battery pack 20*c* as the variable-voltage power supply device supplies a predetermined voltage to the device main body according to the attached device main body.

In FIG. 6, while the power supply-side terminals provided to protrude to the slits 29 in the battery pack 20*c* are designated by reference numeral 30, any one of the power supply-side terminals 30 corresponds to the power supply-side terminals 43*a* and 45*a* for a positive electrode, and the power supply-side terminals are vertically separated from each other. Similarly, the power supply-side terminals 44*a* and 46*a* for a negative electrode correspond to the other of the power supply-side terminals 30, and the power supply-side terminals are vertically separated from each other. The two power supply-side terminals for a positive electrode are disposed in a common (single) slit 29, and the two power supply-side terminals for a negative electrode are disposed in the common (single) slit 29.

In FIG. 3, the device-side terminals of the device main bodies 10*c* and 10*d* are designated by reference numeral 17, and the two device-side terminals 17 vertically separated from each other are shown. One of the two device-side terminals 17 corresponds to the device-side terminals 43*b* and 45*b* for a positive electrode, and the other corresponds to the power supply-side terminals 44*b* and 46*h* for a negative electrode.

As shown in FIG. 11A and FIG. 11B, when three power storage units are incorporated in the battery pack 20c as the variable-voltage power supply device, the battery pack 20c is a variable-voltage power supply device configured to output a high voltage three times that of the battery pack 20b as the low voltage power supply device. The number of power storage units provided in the battery pack 20c is not limited to two shown in FIG. 11A and FIG. 11B and may be integer multiple of two or more.

The cutout section 34a having the same size as the battery pack 20c is formed in the erroneous attachment prevention section 25 of the battery pack 20d as the high voltage power supply device shown in FIG. 7, and further, a protrusion 51 as the power supply-side erroneous attachment prevention section (the auxiliary erroneous attachment prevention section) is provided on a rear end side portion of an attachment/detachment section 22d. The protrusion 51 is inclined upward from a tip portion toward a rear end portion of the attachment/detachment section 22d and protrudes from the attachment/detachment section 22d. Meanwhile, as shown in FIG. 3, a concave section 52 into which the protrusion 51 enters to be incorporated is formed in the abutting section 18 of the common device main body 10c as a device-side attachment permitting section. Accordingly, when the slide rails 24 of the battery pack 20d are inserted into the guide grooves 14 of the device main body 10c to attach the battery pack 20d to the device main body 10c, the protrusion 51 is combined with the concave section 52 while the rib 33a enters the cutout section 34a. Accordingly, the erroneous attachment prevention section 25 abuts the protruding section 15 and the battery pack 20d is attached to the device main body 10c. Here, the attachment/detachment operating section 31 of the battery pack 20d abuts against the abutting section 18.

Figure 12:
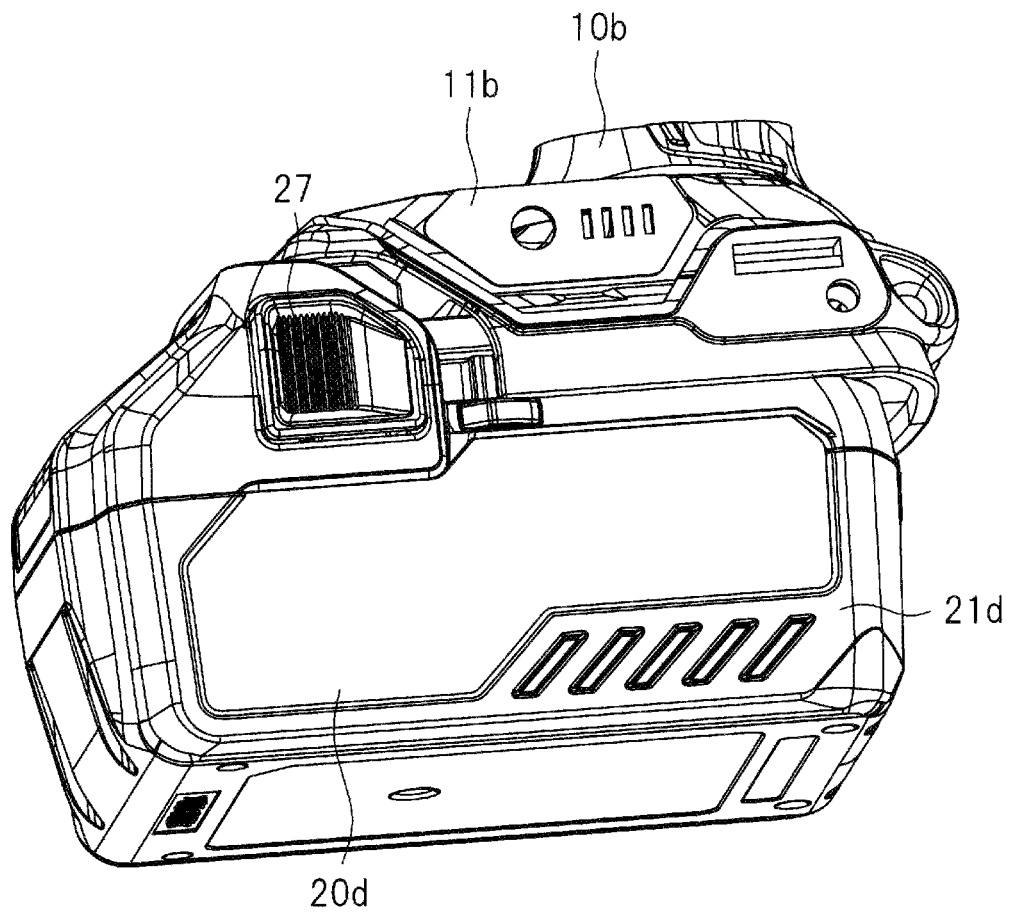
FIG. 12 is a perspective view showing a state in which the battery pack in FIG. 7 is not attached to the device main body in FIG. 2B.

On the other hand, when the battery pack 20d is attached to the device main body 10b, as shown in FIG. 2B, a concave section with which the protrusion 51 is combined is not formed in the abutting section 18 of the low voltage device main body 10b. Accordingly, the protrusion 51 as the power supply-side erroneous attachment prevention section of the battery pack 20d abuts the abutting section 18 as the device-side erroneous attachment prevention section (the auxiliary erroneous attachment prevention section), the high voltage battery pack 20d is not attached to the device main body 10b, and erroneous attachment to the device main body 10b is prevented. FIG. 12 shows a state in which the protrusion 51 abuts the abutting section 18 and the battery pack 20d cannot be attached to the device main body 10b while the battery pack 20d is attached to the device main body 10b.

Further, the concave section 52 shown in FIG. 3 may be replaced with the protrusion 51, and the protrusion 51 of the battery pack 20d shown in FIG. 7 may be replaced with the concave section 52.

Figure 13:
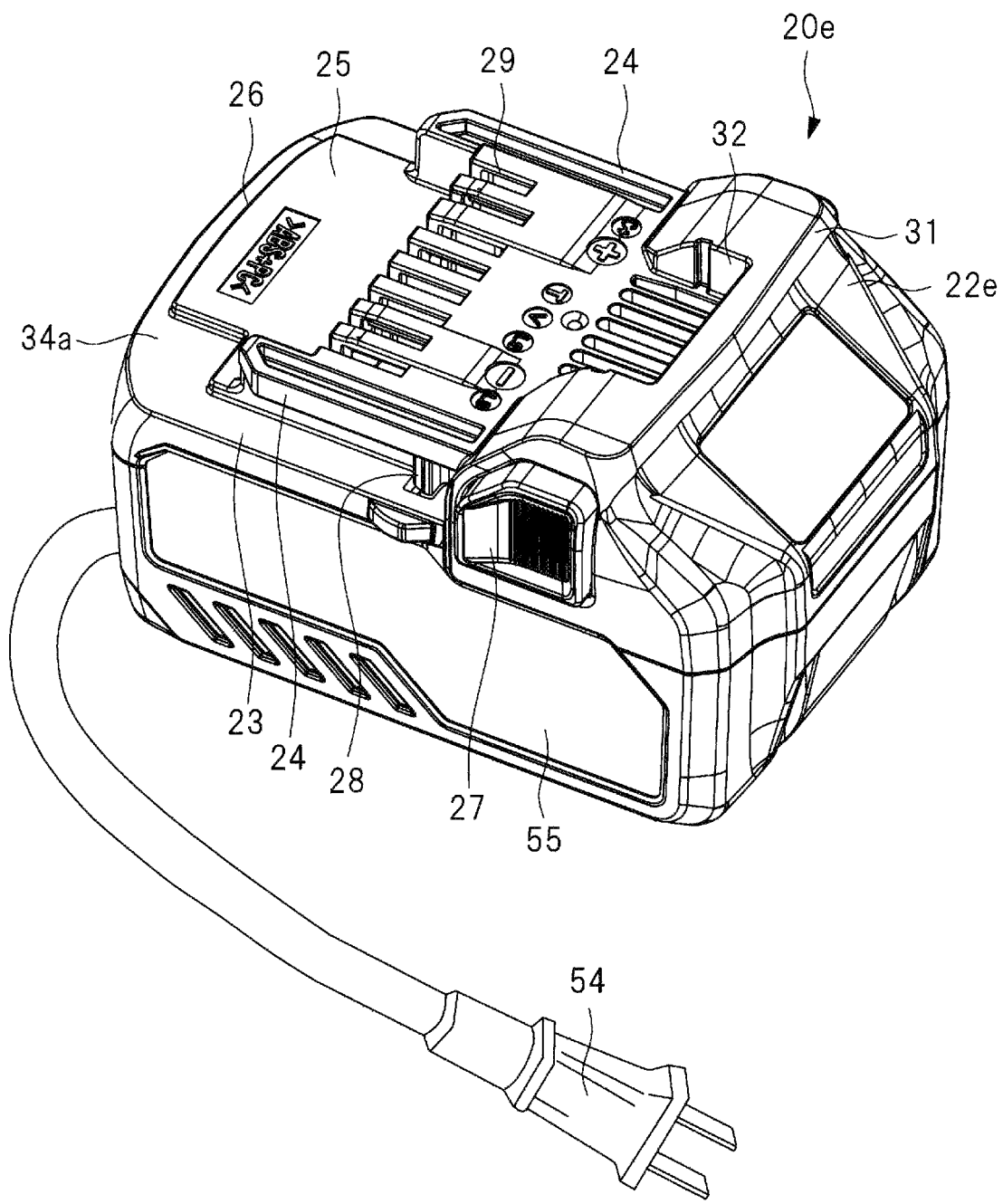
FIG. 13 is a perspective view showing a power supply adapter as a variable-voltage power supply device that is able to selectively output 18 V or 36 V.

FIG. 13 is a perspective view showing a power supply adapter 20e that is able to selectively output 18 V or 36 V as another embodiment of the variable-voltage power supply device. The power supply adapter 20e has a connector 54 connected to a commercial power supply, includes a transformer configured to convert a commercial voltage into a predetermined voltage and a rectifier circuit configured to convert commercial current into direct current, which are provided in an adapter main body 55, and selectively outputs a low voltage of 18 V and a high voltage of 36 V. An attachment/detachment section 22e of the power supply adapter 20e has the same structure as that of an attachment/detachment section 22c of the battery pack 20c, and the cutout section 34a is formed in the erroneous attachment prevention section 25.

Accordingly, like the battery pack 20c, the power supply adapter 20e can be attached to the low voltage device main body 10b shown in FIG. 2B and can also be attached to the common device main body 10c shown in FIG. 3.

Figure 14:
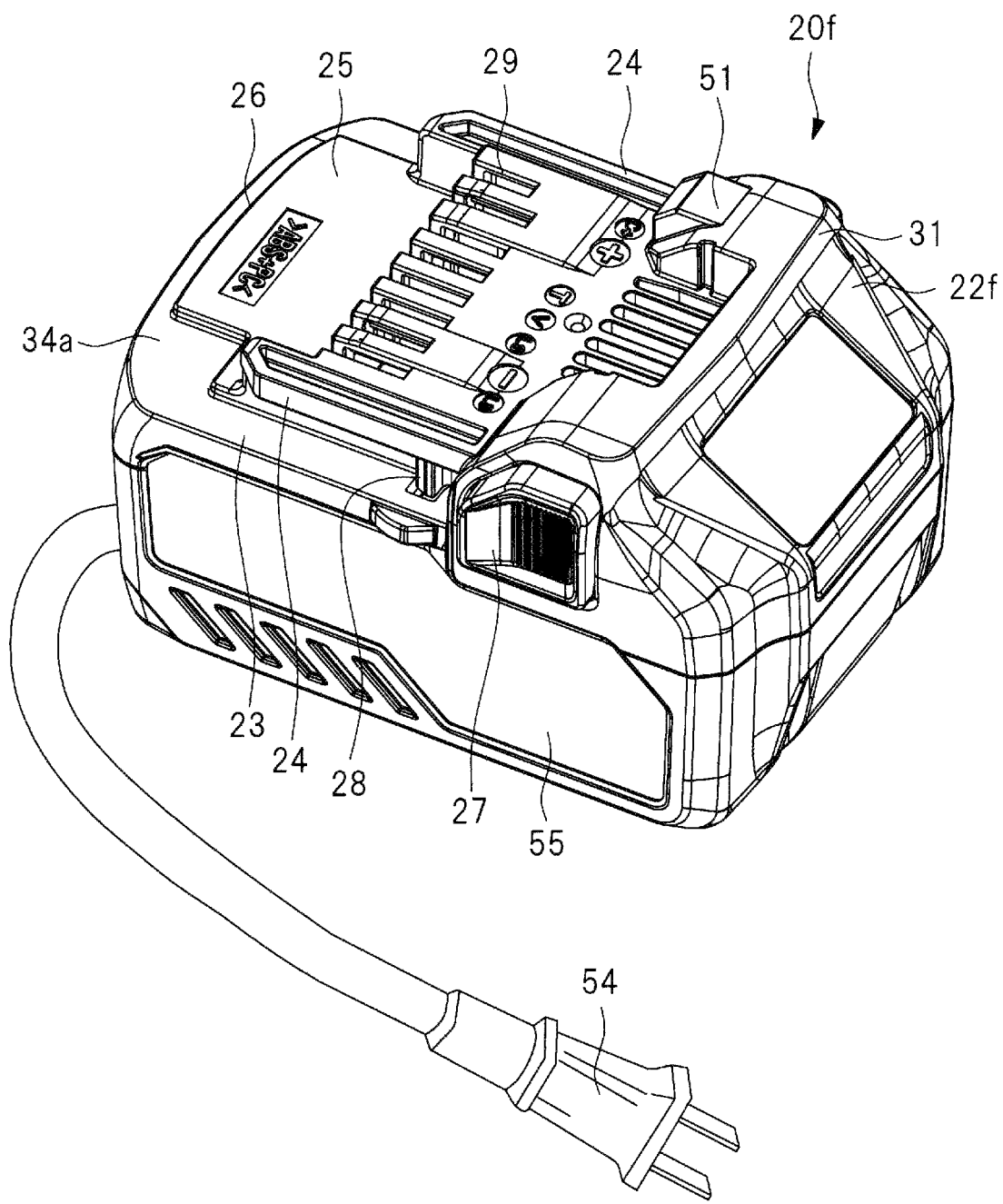
FIG. 14 is a perspective view showing a power supply adapter as a high voltage power supply device that outputs 36 V.

FIG. 14 is a perspective view showing a power supply adapter 20f as the high voltage power supply device that outputs 36 V. The power supply adapter 20f has the connector 54 connected to a commercial power supply, and includes a transformer configured to convert a commercial voltage into a voltage of 36 V and a rectifier circuit configured to covert the current into direct current, which are provided in the adapter main body 55. An attachment/detachment section 22f of the power supply adapter 20f has the same structure as that of the attachment/detachment section 22d of the 36 V-dedicated battery pack 20d, the cutout section 34a is formed in the erroneous attachment prevention section 25, and the protrusion 51 as the power supply-side erroneous attachment prevention section is provided on a tip portion of the attachment/detachment section 22f. Accordingly, like the battery pack 20d, the power supply adapter 20f can be attached to the high voltage device main body 10c shown in FIG. 3.

Instead of the battery pack 20b as the low voltage power supply device and the battery pack 20a as the additional low voltage power supply device, power supply adapters can also be applied thereto, respectively.

Figure 15:
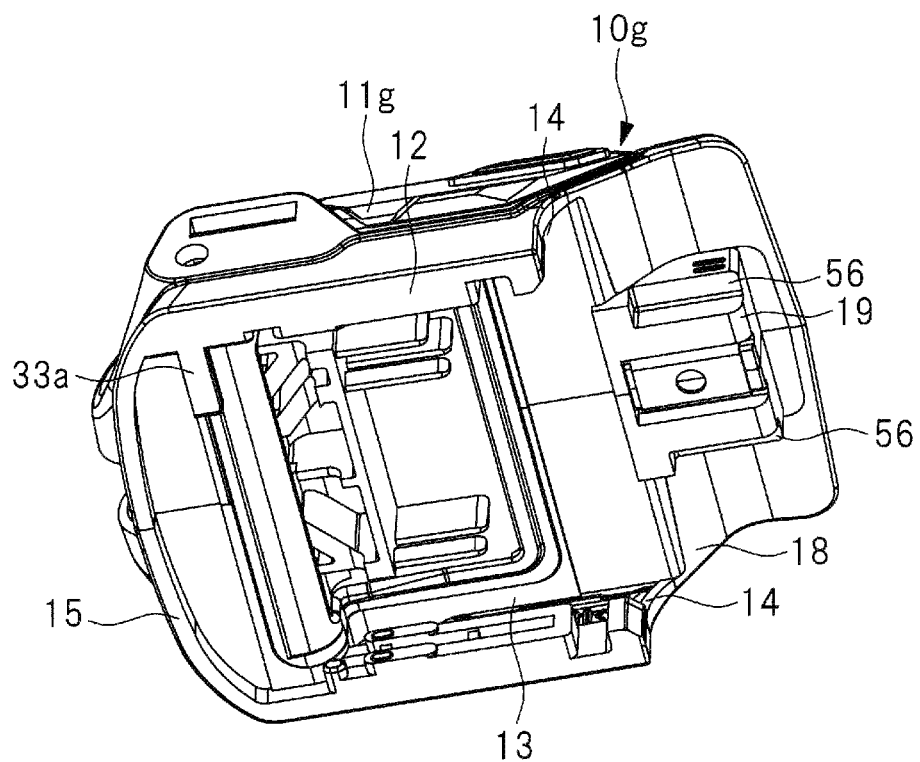
FIG. 15 is a perspective view showing a lower surface of a power supply attaching section of a device main body that is another embodiment of a common device main body having a rated voltage of 36 V.
Figure 16:
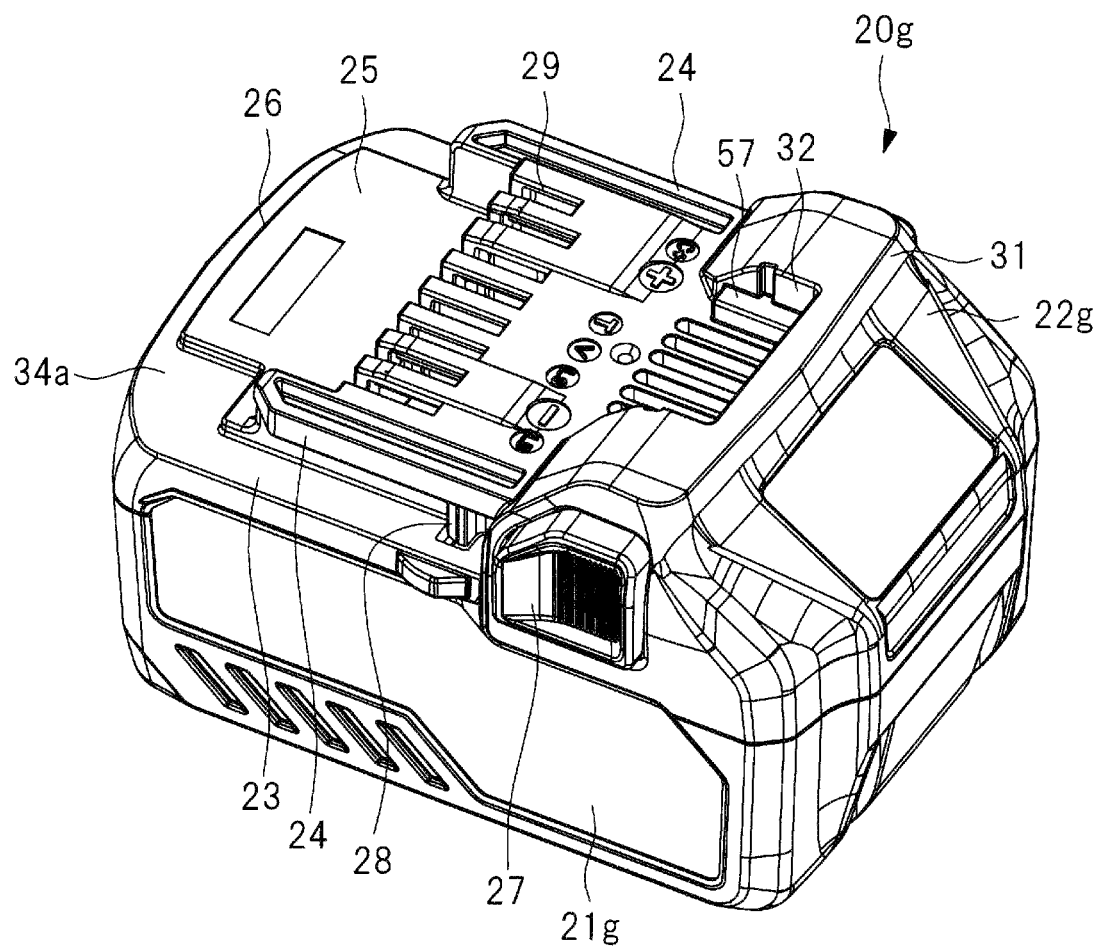
FIG. 16 is a perspective view showing another embodiment of the battery pack as the high voltage power supply device of 36 V attached to the device main body shown in FIG. 15.

FIG. 15 is a perspective view showing a lower surface of the power supply attaching section 11g of the device main body 10g that is another embodiment of the common device main body having a rated voltage of 36 V. FIG. 16 is a perspective view showing a 36 V-dedicated battery pack 20g as the high voltage power supply device attached to the device main body 10g shown in FIG. 15.

As shown in FIG. 15, like the device main body 10c, the rib 33a configured to prevent erroneous attachment on the side of the device is provided on one of the guide rails 12 of the common device main body 10g. The rib 33a protrudes inward from the guide rail 12 in the widthwise direction of the device main body 10g, and has the same length dimension as that of the rib 33a of the common device main body 10c. A sliding groove 56 extending in the forward/rearward direction of the device main body 10g is formed in the case piece connecting section 19 provided on the tip portion of the device main body 10g.

Meanwhile, like the battery pack 20d, the cutout section 34a into which the rib 33a enters is formed in the erroneous attachment prevention section 25 of the battery pack 20g. Further, a sliding protrusion 57 as the power supply-side erroneous connection prevention section (the auxiliary erroneous attachment prevention section) is provided on the tip portion of the battery pack 20g to protrude into the concave accommodating section 32, and the sliding protrusion 57 extends in the forward/rearward direction of the device main body 10g.

Figure 17:
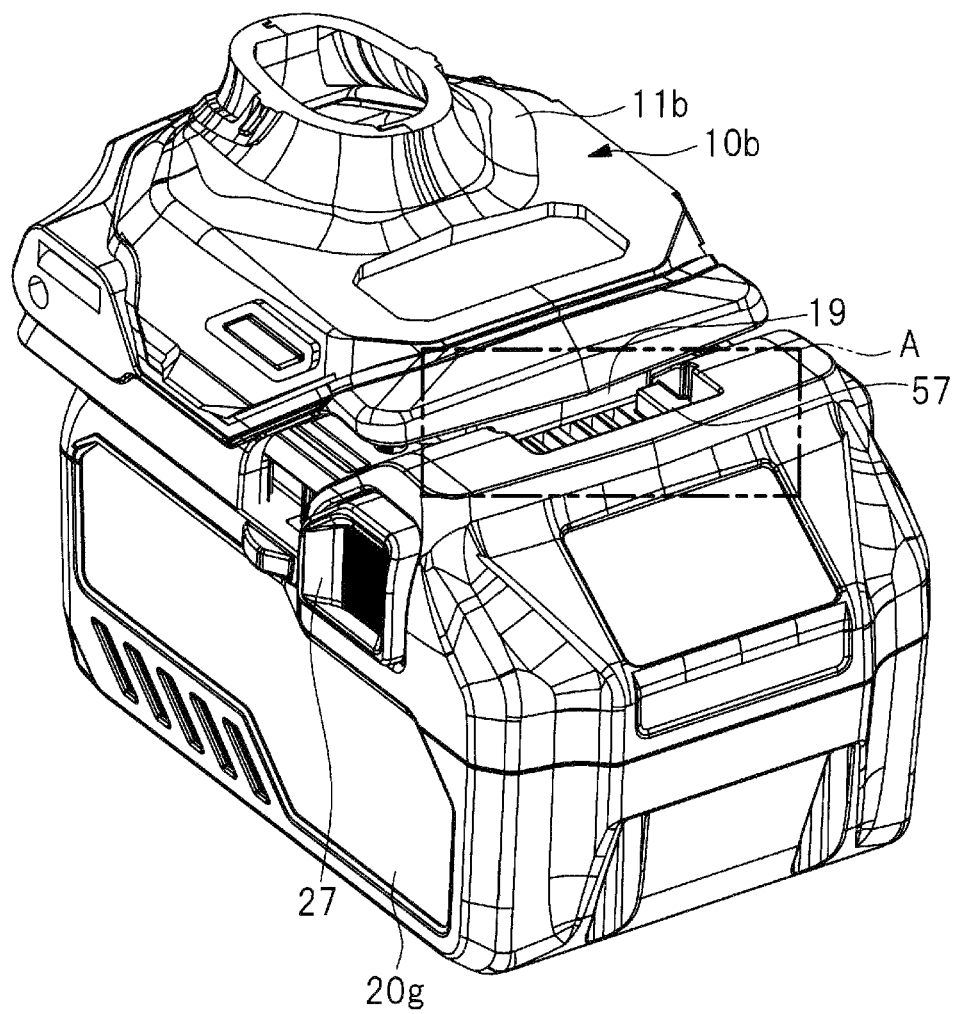
FIG. 17 is a perspective view showing a state in which the battery pack in FIG. 16 is not attached to the device main body in FIG. 2B.
Figure 18:
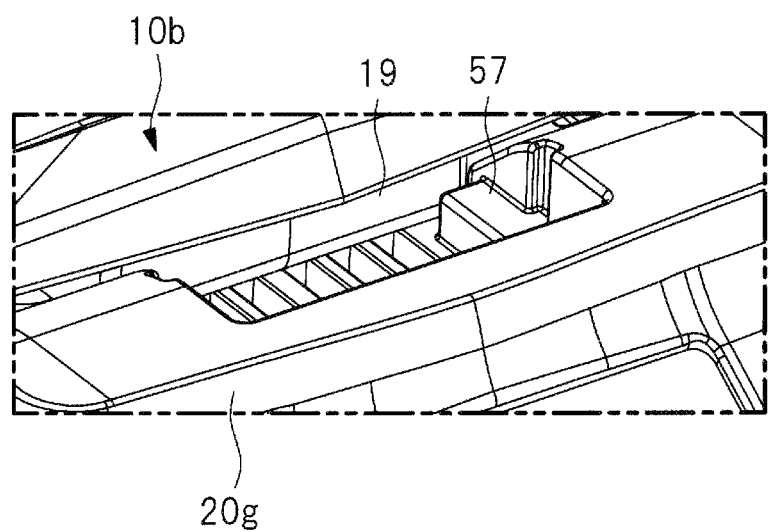
FIG. 18 is an enlarged perspective view of a portion A in FIG. 17.

When the battery pack 20g is attached to the device main body 10g, when the rib 33a enters the cutout section 34a, the sliding protrusion 37 enters the sliding groove 56 and is combined with the sliding groove 56. Accordingly, the erroneous attachment prevention section 25 abuts the protruding section 15 and attachment of the battery pack 20g with respect to the device main body 10g is terminated. On the other hand, as shown in FIG. 17 and FIG. 18, when the battery pack 20g is attached to the device main body 10b, the sliding protrusion 57 abuts the case piece connecting section 19, and the battery pack 20g cannot be attached to the device main body 10b. Further, when the battery pack 20g is attached to the device main body 10d, since the sliding protrusion 57 abuts the tip surface of the case piece connecting section 19, the battery pack 20g cannot be attached to the device main body 10d.

Accordingly, the battery pack 20g is attached to only the common device main body 10g. Similarly, the battery pack 20d and the power supply adapter 20f are attached to only the common device main body 10c.

While FIG. 16 shows a high voltage-dedicated battery pack 20g as the high voltage power supply device having a rated voltage of 36 V, the battery pack as the high voltage power supply device may have a shape shown in FIG. 16 instead of the shape shown in FIG. 14.

FIG. 19 is a system configuration table of an electrical device group constituted by the plurality of device main bodies, and the plurality of battery packs and power supply adapters attached to the device main bodies. In FIG. 19, ○ represents that the power supply device can be attached to the device main body, and x represents that attachment of the power supply device to the device main body is impossible.

As described above, either the battery pack 20c and the power supply adapter 20e as the variable-voltage power supply device or the battery pack 20d and the power supply adapter 20f as the high voltage power supply device are selectively attached to the common device main body 10c, and the electrical device is constituted by the variable-voltage power supply device or the high voltage power supply device attached to the common device main body 10c. Similarly, either of the battery pack 20c and the power supply adapter 20e as the variable-voltage power supply device and the battery pack 20g as the high voltage power supply device is selectively attached to the common device main body 10a, and the electrical device is constituted by the variable-voltage power supply device or the high voltage power supply device attached to the common device main body 10g.

The common device main body 10c has the protruding section 15 with which the power supply-side erroneous attachment prevention section 25 provided on the variable-voltage power supply device and the high voltage power supply device abuts, and a device-side erroneous attachment prevention section 33a configured to prevent the battery pack 20b from abutting the power supply-side erroneous attachment prevention section 25 of the battery pack 20b as the low voltage power supply device and abutting the protruding section 15. Further, the device main body 10c has the concave section 52 as the device-side attachment permitting section combined with a power supply-side erroneous attachment prevention section 51 (an auxiliary erroneous attachment prevention section) provided on the high voltage power supply device.

In the common device main body 10g, the protruding section 15 of the common device main body 10c and the device-side erroneous attachment prevention section 33a are provided, and the sliding groove 56 as the device-side attachment permitting section is provided instead of the concave section 52 of the device main body 10c.

Meanwhile, the power supply device has at least the variable-voltage power supply device and the high voltage power supply device, and the battery packs 20c and 20e as the variable-voltage power supply device are selectively attached to either the low voltage device main body 10b or the common device main body 10c. The battery pack 20d as the high voltage power supply device and the power supply adapter 20f are attached to the common device main body 10c, and not attached to the low voltage device main body 10b. The power supply-side erroneous attachment prevention section 25 is provided on a rear end portion of the high voltage power supply device, and further, the power supply-side erroneous attachment prevention section 51 is provided on a tip portion thereinto. Similarly, the battery pack 20g as the high voltage power supply device is attached to the common device main body 10g and not attached to the low voltage device main body 10b.

In this way, even when the power supply device attachment/detachment section and the power supply attaching section of the device main body are standardized, inappropriate devices of a lot of power supply devices having different output voltages are prevented from being erroneously attached to the device main body, and thus, the device main body can be safely operated.

As shown in FIG. 19, in the electrical device system formed of an electrical device group constituted by the low voltage power supply device, the variable-voltage power supply device, the low voltage device main body and the common device main body, either the low voltage power supply device or the variable-voltage power supply device is selectively attached to the low voltage device main body 10b. In addition, the variable-voltage power supply device is attached to the common device main bodies 10c and 10a, and erroneous attachment of the low voltage power supply device is prevented. In addition, when the high voltage power supply device is added to the electrical device group, while the high voltage power supply device can be attached to the common device main body, erroneous attachment to the low voltage device main body 10b is prevented. Further, when the electrical device including the device main body 10d is added, the electrical device capable of attaching only the variable-voltage power supply device is added to the electrical device group.

The electrical device constituted by the device main body and the power supply device has the device main body having a large rated voltage of 36 V that is larger than a reference of a rated voltage of 18 V, the device having 18 V is a low voltage device main body, the device having 36 V is a common device main body that is a high voltage-dedicated device main body, and the device having 14.4 V is an additional low voltage main body. However, the rated voltages are exemplary, and the rated voltages are not limited thereto as long as a device having a reference voltage is a low voltage type and a device having a voltage higher than the reference voltage is a high voltage type.

The variable-voltage power supply device includes a plurality of output terminals configured to output low voltages and be electrically insulated from each other, and can output a low voltage and a high voltage that is integer times of two or more of the low voltage. Moreover, the variable-voltage power supply device and the low voltage power supply device can be attached to any one of the low voltage device main body, the common device main body and the high voltage-dedicated device main body while preventing erroneous attachment.

The present disclosure is not limited to the embodiment and may be variously modified without departing from the spirit of the present disclosure. For example, while FIG. 1 shows the impact driver 1 that is an example of the electrical device, the present disclosure can also be applied to another electrical device such as a drill, a lawn mower, a dust collector, or the like, as the electrical device. When the structure in which the power supply attaching sections of the device main bodies of the different types of the electrical devices such as the impact driver, the lawn mower, and the like, have the plurality of types as described above, and the attachment/detachment section of the power supply device is attached to the power supply attaching sections of the plurality of device main bodies is provided, the same power supply device can be applied to different types of electrical devices.

The invention claimed is:

1. An electrical device system comprising:
a low voltage power supply device that is able to output a low voltage,
a variable-voltage power supply device that is able to selectively output a high voltage or a low voltage,
a low voltage device main body to which the low voltage power supply device or the variable-voltage power supply device is selectively attachable, and
a common device main body to which the variable-voltage power supply device is attachable,
wherein the low voltage power supply device has a power supply-side main erroneous attachment prevention section configured to abut a device-side main erroneous attachment prevention section provided on the common device main body and to prevent attaching to the common device main body.

2. The electrical device system according to claim 1, further comprising:
a high voltage power supply device that is able to output a high voltage,
wherein the high voltage power supply device has an auxiliary erroneous attachment prevention section that abuts the low voltage device main body.

3. The electrical device system according to claim 1, wherein the variable-voltage power supply device has a plurality of power storage units that are able to output a low voltage,
the common device main body has a serial connecting circuit configured to connect the power storage units in series when the variable-voltage power supply device is attached, and
the low voltage device main body has a parallel connecting circuit configured to connect the power storage units in parallel when the variable-voltage power supply device is attached.

4. An electrical device comprising:
a device main body to which any one of a variable-voltage power supply device and a high voltage power supply device is selectively detachably attached, the variable-voltage power supply device is able to selectively output a high voltage or a low voltage, the high voltage power supply device is able to output a high voltage,
wherein the device main body comprises:
a device-side main erroneous attachment prevention section configured to avoid abutting a power supply-side main erroneous attachment prevention section provided on the variable-voltage power supply device and the high voltage power supply device, and abut a power supply-side main erroneous attachment prevention section provided on a low voltage power supply device that is able to output a low voltage and to prevent attaching to the low voltage power supply device; and
a device-side attachment permitting section combined with a power supply-side auxiliary erroneous attachment prevention section provided on the high voltage power supply device and to permit attaching to the high voltage power supply device.

5. The electrical device according to claim 4, wherein the power supply-side main erroneous attachment prevention section is provided on a rear end portion side of the power supply device in a direction of attachment of the power supply device to the device main body,
the power supply-side auxiliary erroneous attachment prevention section is a protrusion provided on a tip portion side of the power supply device in the attachment direction, and
the device-side attachment permitting section is a concave section with which the protrusion is combined.

6. The electrical device according to claim 4, wherein the variable-voltage power supply device has a plurality of power storage units that are able to output a low voltage, and the device main body is configured to connect the power storage units in series when the variable-voltage power supply device is attached.

7. A high voltage power supply device detachably attached to a device main body, to which a variable-voltage power supply device capable of outputting a high voltage or a low voltage is detachably attached, the high voltage power supply device comprising:
a power supply-side main erroneous attachment prevention section configured to avoid abutting a device-side main erroneous attachment prevention section provided on the device main body;
a power supply-side auxiliary erroneous attachment prevention section combined with a device-side attachment permitting section provided on the device main body and permit attaching to the device main body and configured to abut a device-side auxiliary erroneous attachment prevention section provided on a device main body to which the variable-voltage power supply device is detachably attached and driven by the low voltage.

8. An electrical device comprising the high voltage power supply device according to claim 7.

* * * * *